(12) United States Patent
Zhang et al.

(10) Patent No.: US 11,644,731 B2
(45) Date of Patent: May 9, 2023

(54) DISPLAY PLASMA MODULE WITH DOUBLE-LAYER MICROSTRUCTURE AND MANUFACTURING METHOD THEREOF

(71) Applicant: WUXI VISION PEAK TECHNOLOGY CO., LTD, Wuxi (CN)

(72) Inventors: Lei Zhang, Wuxi (CN); Jin Bao, Wuxi (CN); Shan Chen, Wuxi (CN)

(73) Assignee: WUXI VISION PEAK TECHNOLOGY CO., LTD, Wuxi (CN)

( * ) Notice: Subject to any disclaimer, the term of this patent is extended or adjusted under 35 U.S.C. 154(b) by 436 days.

(21) Appl. No.: 16/623,985

(22) PCT Filed: Oct. 9, 2018

(86) PCT No.: PCT/CN2018/109434
§ 371 (c)(1),
(2) Date: Dec. 18, 2019

(87) PCT Pub. No.: WO2020/062321
PCT Pub. Date: Apr. 2, 2020

(65) Prior Publication Data
US 2021/0341811 A1 Nov. 4, 2021

(30) Foreign Application Priority Data
Sep. 25, 2018 (CN) .......................... 201811118791.2

(51) Int. Cl.
*G02F 1/167* (2019.01)
*G02F 1/16756* (2019.01)
(Continued)

(52) U.S. Cl.
CPC ............ *G02F 1/167* (2013.01); *G02F 1/1676* (2019.01); *G02F 1/1679* (2019.01); *G02F 1/16756* (2019.01); *G02F 2201/50* (2013.01)

(58) Field of Classification Search
CPC ...... G06F 1/167; G06F 1/1679; G06F 1/1681; G06F 1/1676; G06F 1/16766;
(Continued)

(56) References Cited

U.S. PATENT DOCUMENTS 7,038,670 B2 * 5/2006 Liang ...................... G02F 1/167
345/204
2007/0029931 A1 2/2007 Kobayashi et al.
(Continued)

FOREIGN PATENT DOCUMENTS

CN 102650788 A 8/2012
CN 107357109 * 11/2017 ........... G02F 1/1679
(Continued)

*Primary Examiner* — Brandi N Thomas
(74) *Attorney, Agent, or Firm* — Bayramoglu Law Offices LLC

(57) ABSTRACT

A display plasma module with a double-layer microstructure includes a pixel electrode and a transparent electrode located above the pixel electrode. A display plasma and a liner frame surrounding the display plasma are arranged between the pixel electrode and the transparent electrode. A plasma barrier array used for uniformly dispersing and stabilizing the display plasma is arranged on the pixel electrode and/or the transparent electrode, and a spacer particle layer is adsorbed on the plasma barrier array. The display plasma module directly uses the display plasma to replace the micro-cup structure or the microcapsule structure, and is provided with the plasma barrier array and the spacer particle layer used for uniformly dispersing, stabilizing and isolating the display plasma, which has a function of sup-
(Continued)

porting the whole display plasma module and controlling the thickness of the display plasma.

9 Claims, 1 Drawing Sheet

(51) Int. Cl.
*G02F 1/1679* (2019.01)
*G02F 1/1676* (2019.01)

(58) Field of Classification Search
CPC ............ G06F 1/16757; G06F 1/16756; G06F 1/1677; G06F 2001/1678; G06F 2201/50; G06F 1/1339; G06F 1/1685; G06F 1/13439; G06F 1/13338; G06F 2202/16; G06F 1/134309; G06F 1/1345; G06F 1/1368; G06F 2201/121; G06F 1/13394; G06F 1/16755; G06F 1/1675; G06F 2201/42; G06F 1/1341; G06F 1/136213; G06F 1/133377; G06F 1/133382; G06F 1/136; G06F 1/13624; G06F 2203/01; G06F 2203/34; G06F 1/13452; G06F 1/136259; G06F 1/136263; G06F 1/136272; G06F 2202/28; G06F 1/1333; G06F 1/133345; G06F 1/133512; G06F 1/136286; G06F 2201/123; G06F 1/133305; G06F 1/1362; G06F 1/133388; G06F 1/1334; G06F 1/133514; G06F 1/1343; G06F 2201/122; G06F 2201/40; G06F 1/13; G06F 1/133553; G06F 1/1365; G06F 1/16762; G06F 2201/44; G06F 1/13306; G06F 1/13613; G06F 1/136209; G06F 1/172; G06F 1/23; G06F 2201/02; G06F 2201/08; G06F 2201/34; G06F 1/0107; G06F 1/1326; G06F 1/133; G06F 1/1335; G06F 1/133502; G06F 1/133504; G06F 1/133516; G06F 1/133524; G06F 1/133555; G06F 1/133562; G06F 1/133565; G06F 1/1337; G06F 1/133734; G06F 1/13415; G06F 1/134336; G06F 1/134363; G06F 1/13456; G06F 1/1347; G06F 1/136222; G06F 1/136227; G06F 1/136254; G06F 1/136277; G06F 1/13629; G06F 1/13718; G06F 1/1514; G06F 2201/16; G06F 2202/36; G06F 2202/42; G06F 2203/02; G09G 3/344; G09G 2300/08; G09G 2310/04; G09G 2310/061; G09G 2310/068; G09G 3/3446; G09G 2300/0426; G09G 2320/0204; G09G 2310/06; G09G 2320/0257; G09G 2320/0233; G09G 2370/08; G09G 2320/0252; G09G 2300/0819; G09G 2320/0209; G09G 3/34; G09G 2320/046; G09G 2330/021; G09G 2330/08; G09G 3/3688; G09G 2310/065; G09G 3/2014; G09G 2310/02; G09G 2310/0205; G09G 2310/0275; G09G 2320/041; G09G 2320/103; G09G 2354/00; G09G 2360/18; G09G 3/20; G09G 3/2018; G09G 2310/0251; G09G 2320/0285; G09G 2300/0452; G09G 2300/0876; G09G 2310/0267; G09G 2320/0247; G09G 3/38; G09G 1/165; G09G 1/167; G09G 1/285; G09G 2300/023; G09G 2310/0218; G09G 2320/02; G09G 2320/043; G09G 2330/022; G09G 2330/025; G09G 2340/16; G09G 2370/10; G09G 2370/12; G09G 3/006; G09G 3/2092; G09G 3/2096; G09G 3/3406; G09G 5/003; G09G 5/006; G09G 5/04; G09G 2300/06; G09G 2300/0809; G09G 2300/0814; G09G 2310/0248; G09G 2310/0254; G09G 2310/063; G09G 2320/0219; G09G 2320/04; G09G 2320/0613; G09G 3/2007; G09G 3/2011; G09G 3/2022; G09G 3/2025; G09G 3/3648; G09G 5/14; G09G 2300/026; G09G 2300/0417; G09G 2300/0473; G09G 2300/0842; G09G 2300/0857; G09G 2300/0885; G09G 2310/021; G09G 2310/0224; G09G 2310/0245; G09G 2310/0262; G09G 2310/027; G09G 2310/0283; G09G 2310/0286; G09G 2310/08; G09G 2320/0626; G09G 2320/10; G09G 2330/04; G09G 2330/12; G09G 2360/12; G09G 2360/148; G09G 2380/02; G09G 2380/14; G09G 3/003; G09G 3/2051; G09G 3/2074; G09G 3/3208; G09G 3/36; G09G 3/3611; G09G 3/3666; G09G 3/367; G09G 3/3674; G09G 3/3685

See application file for complete search history.

(56) References Cited

U.S. PATENT DOCUMENTS

| 2012/0089180 | A1* | 4/2012 | Fathi | B32B 38/0008 |
| | | | | 257/E23.116 |
| 2012/0200910 | A1* | 8/2012 | Hayashi | G02F 1/167 |
| | | | | 156/196 |
| 2016/0116818 | A1 | 4/2016 | Du et al. | |

FOREIGN PATENT DOCUMENTS

| CN | 108181772 A | | 6/2018 | |
| CN | 108267906 A | | 7/2018 | |
| JP | 2003322883 | * | 11/2003 | ............... G02F 1/17 |
| JP | 2013205606 A | | 10/2013 | |
| KR | 101214334 B1 | * | 12/2012 | ....... G02F 1/133308 |

* cited by examiner

DISPLAY PLASMA MODULE WITH DOUBLE-LAYER MICROSTRUCTURE AND MANUFACTURING METHOD THEREOF

CROSS REFERENCE TO THE RELATED APPLICATIONS

This application is the national phase entry of International Application No. PCT/CN2018/109434, filed on Oct. 9, 2018, which is based upon and claims priority to Chinese Patent Application No. 201811118791.2, filed on Sep. 25, 2018, the entire contents of which are incorporated herein by reference.

TECHNICAL FIELD

The present disclosure relates to a display plasma module and a manufacturing method thereof. More particularly, the present disclosure relates to a display plasma module with double-layer microstructure and a manufacturing method thereof, which belongs to the technical field of electronic display.

BACKGROUND

Electrophoresis display uses the electrophoresis phenomenon of charged colloidal particles under the action of an electronic field. The electrophoresis display of images and characters is realized by driving electrophoretic particles with different photoelectric properties by an electronic field. Compared with the known display technologies, the electrophoresis display has the advantages of the capability of flexibility and easy bending, light weight, thin thickness, high contrast ratio, low energy consumption, large visual angle, readable under sunlight, bistable images, large-area production and the like.

Electrophoretic display technology was first proposed in the 1970s. A process for preparing an electrophoretic display material including at least one kind of electrophoretic particle is disclosed in the U.S. Pat. No. 3,892,568. An electrophoretic display system containing at least one kind of electrophoretic particle and having an electrophoretic liquid coated with a microcapsule is disclosed in the Japanese patent No. 1086116. An electrophoretic display unit having an electrophoretic liquid coated with a micro-cup structure is disclosed in the U.S. Pat. No. 6,930,818. An electrophoretic display unit coated with a microencapsule is disclosed in the U.S. Pat. No. 5,930,026, No. 5961804, No. 6017584, and No. 6120588, wherein the display plasma contains two or more kinds of electrophoretic particles with different photoelectric properties. In the prior art, the micro-cup type electronic ink display screen and the microcapsule-type electronic ink display screen are based on micro cavity structure, namely micro-cup and microcapsule. The function of the two microstructures is to disperse and coat the display plasma.

Although the display screen based on both structures is applied to actual products, the two structures have the following disadvantages.

1) The microcapsule and the micro-cup do not have the display function. Although the material of the microcapsule and the micro-cup is transparent and suffers from poor covering force, the amount of the material in the electrophoresis display system is large, which affects the display effect of the whole display screen, decreases the contrast and the resolution ratio, and even the service life of the screen itself is compromised.

2) The thickness of the whole electrophoretic display material layer is thickened due to the presence of the microcapsule structure and the micro-cup structure. The contrast and the resolution of the display screen are decreased, the response speed is slow, the driving voltage is high, the refresh rate is slow, the power consumption is large, and the working temperature range is narrow.

3) The preparation process of the microcapsule structure and the micro-cup structure is excessively complex, which causes difficulty and waste in production, manufacturing, yield reduction, material waste, and high manufacturing cost.

SUMMARY

In view of the problem of the current electronic display screen, the objective of the present invention is to provide a display plasma module with double-layer microstructure and a manufacturing method thereof, which can directly use the display plasma to replace the micro-cup structure or the microcapsule structure in the prior art. The display plasma is provided with a plasma barrier array and a spacer particle layer used for uniformly dispersing, stabilizing and isolating the display plasma, thereby supporting the electrodes and controlling the thickness of the display plasma. This will effectively prevent the display plasma from flowing in disorder, and ensures the movement of the electric field direction between the pixel electrode and the transparent electrode.

In order to realize the above technical objective, the technical solution of the present invention is as follows: A display plasma module with double-layer microstructure including a pixel electrode and a transparent electrode located above the pixel electrode, wherein, a display plasma and a liner frame surrounding the display plasma are provided between the pixel electrode and the transparent electrode. A plasma barrier array, used for uniformly dispersing and stabilizing the display plasma, is disposed on the pixel electrode and/or the transparent electrode, and a spacer particle layer is adsorbed on the plasma barrier array.

In a further improvement, the plasma barrier array includes a plurality of plasma barrier frames distributed in an array. The pixel electrode includes a plurality of pixel electrode units distributed in the array. Each plasma barrier frame includes the plurality of pixel electrode units, and the plasma barrier frame on the pixel electrode covers on the source line and the gate line.

In a further improvement, the width of the plasma barrier frame in the plasma barrier array is between 1 and 30 microns, the height of the plasma barrier frame is between 0.1 and 60 microns, and the size of spacer particles in the spacer particle layer is between 1 and 10 microns.

In a further improvement, the material of the plasma barrier frame and the liner frame in the plasma barrier array is acrylic resin, polyurethane resin, epoxy resin, organosilicon resin, or silica. The spacer particles in the spacer particle layer are polymer microspheres or silica microspheres.

In a further improvement, the pixel electrode is embedded on the thin film transistor (TFT) glass substrate, and the pixel electrode and the display plasma are adhered through a light-shielding insulating adhesive layer.

In a further improvement, the transparent electrode includes a conductive layer overlying the display plasma and the liner frame, and a transparent substrate overlying the conductive layer. A display area protective layer is arranged between the liner frame and the conductive layer, and between the edge of the display plasma and the conductive layer.

In a further improvement, the thickness of the display plasma is between 2 and 70 microns, and a viscosity of an electrophoretic liquid in the display plasma is between 100 and 100,000 centipoises. The display plasma includes at least two kinds of electrophoretic particles with different photoelectric properties.

In a further improvement, supporting microspheres may be added in the liner frame. The supporting microspheres include resin microspheres and glass microspheres, and the diameter of the supporting microspheres is 2-60 microns.

In order to further realize the above-mentioned technical objective, the present invention further provides a method for manufacturing the display plasma module with the double-layer microstructure, wherein, the method includes the following steps:

step 1: preparing the plasma barrier array on the conductive layer of the pixel electrode and/or the transparent electrode in advance;

step 2: embedding the pixel electrode in the TFT glass substrate, and placing the TFT glass substrate on the dispensing platform;

step 3: applying a sealing adhesive on the pixel electrode to form the liner frame;

step 4: silk screening the display plasma and spraying the spacer particles in the liner frame, wherein the relatively light spacer particles float on the display plasma;

step 5: coating a conductive silver paste in the liner frame, wherein the conductive silver paste is electrically connected to the pixel electrode;

step 6: firstly, laminating the display area protective layer on the whole liner frame. Secondly, laminating the transparent electrode on the liner frame and the display plasma, wherein, using this process, most of the spacer particles are squeezed, transferred, and adsorbed on the plasma barrier frame of the plasma barrier array to form the spacer particle layer, and then solidifying, wherein the conductive silver paste is electrically connected to the conductive layer of the transparent electrode;

step 7: cutting off the transparent electrode and the display area protective layer on the edge to expose a position predetermined to bind an IC integrated circuit module and a flexible circuit board on the pixel electrode;

step 8: adhering the IC integrated circuit module and the flexible circuit board to the edge of the pixel electrode through a conductive adhesive tape; and step 9: firmly sealing the peripheries of the IC integrated circuit module, the flexible circuit board and the conductive adhesive tape on the pixel electrode by a blue adhesive, thus completing the manufacturing of the electronic ink display screen.

In a further improvement, in step 1, the surface of the pixel electrode may be coated with a light-shielding insulating adhesive layer in advance. The plasma barrier array is coated on the surface of the conductive layer of the pixel electrode or the transparent electrode by printing, coating or dispensing, and then is solidified by light, heat or moisture, or is realized by physical growth and chemical growth. In the step 3, the supporting microspheres may be coated in the sealing adhesive in advance.

The present invention has the following advantages over the conventional electronic ink display screen.

1) Compared with the traditional micro-structure electrophoretic display screen, since the traditional microcapsule or micro-cup does not participate in the display, the display is affected. The present invention adopts the display plasma and removes the microcapsule or the micro-cup, therefore, the display effect is improved, and the contrast ratio is improved by more than 10%.

2) The display plasma of the present invention can reduce the thickness of the whole electrophoretic display layer, the response time is reduced to below 80 milliseconds, the driving voltage is reduced to ±1.5-8 V, the working temperature range is expanded to −30-70 degrees, and the manufacturing cost is reduced.

3) The present invention arranges the plasma barrier array between the pixel electrode and the transparent electrode, which can effectively disperse and stabilize the display plasma, in turn improving the display effect. At the same time, the plasma barrier array on the pixel electrode covers on the source line and the gate line, which effectively prevents the short circuit between adjacent pixel electrodes and prevents an electric field disturbance from generating between the pixel electrodes, and also prevents the electrophoretic particles of the display plasma from gathering on the source line and the gate line. This process ensures that the directionality and perpendicularity of the electric field between the pixel electrode and the transparent electrode, and prevents a disordered movement of the electrophoretic particles in the display plasma.

4) In the present invention, the plasma barrier array and the spacer particle layer are arranged between the pixel electrode and the transparent electrode. Compared with the single plasma barrier array structure, the spacer particle layer and the plasma barrier array have a function of supporting the electrodes, controlling the thickness of the display plasma, and dividing the whole display plasma into a plurality of resistance frames, which ensures that the electrophoretic particles vertically and orderly move along the electric field direction under the action of the electric field, which in turn ensures the stability of the display plasma, and improves the contrast ratio and the display effect of the display screen.

5) In the present invention, the display area protective layer protects the display plasma of the display area, and thus has a function of light-shielding and insulation.

6) In the present invention, the light-shielding insulating adhesive layer is used for protecting the pixel electrode from optical irradiation, separating the display plasma and the pixel electrode, and preventing the display plasma from damaging the pixel electrode;

7) In the present invention, an ultra-thin display plasma module with a size of more than 100 decimeter, can be produced by the technology of the present invention.

Figure 1:
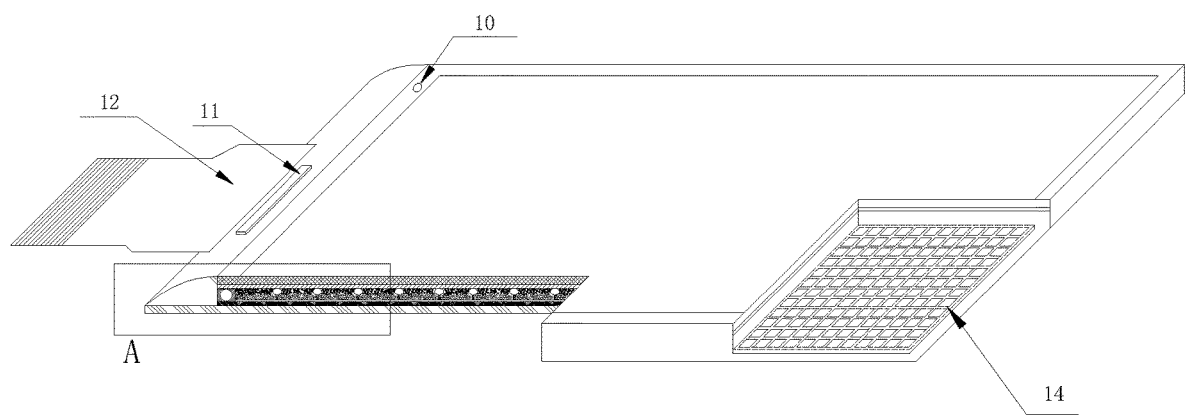
FIG. 1 is a side perspective view showing a structure of embodiment 1 of the present invention.

In the drawings: 1—transparent electrode; 2—conductive layer; 3—display plasma; 4. supporting microsphere; 5—light-shielding insulating adhesive layer; 6—liner frame; 7—TFT glass substrate; 8—display area protective layer; 9—blue adhesive; 10—conductive silver paste; 11—IC integrated circuit module; 12—flexible circuit board; 13—pixel electrode; 14—plasma barrier array; 15—transparent substrate; 16—spacer particle layer.

DETAILED DESCRIPTION OF THE EMBODIMENTS

The present invention will be further described hereinafter with reference to the drawings and the embodiments.

The present invention is not limited to the following embodiments, and the drawings referenced in the following description are only provided to enable a reader to easily understand the content of the present invention, i.e., the present invention is not limited to the structure of the electronic ink display screen illustrated in each drawing.

Figure 2:
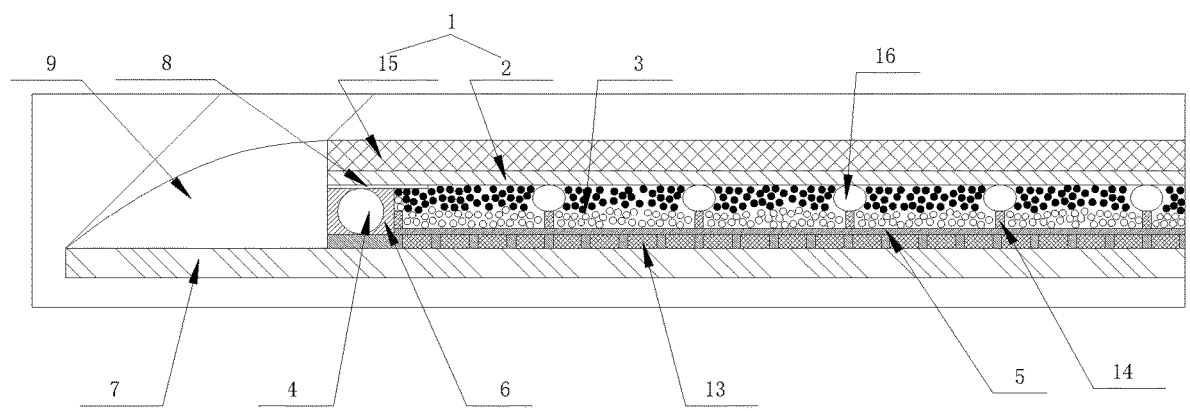
FIG. 2 is a cross-sectional view showing a structure of the portion A in FIG. 1.

As shown in FIG. 1 and FIG. 2, the embodiment 1 takes the double-particle electronic ink display screen as an example. The display plasma module with the double-layer microstructure includes the pixel electrode 13 and the transparent electrode 1 located above the pixel electrode 13. The display plasma 3 and the liner frame 6 surrounding the display plasma 3 are arranged between the pixel electrode 13 and the transparent electrode 1. The pixel electrode 13 is provided with the plasma barrier array 14 used for uniformly dispersing and stabilizing the display plasma 3, and the spacer particle layer 16 is adsorbed on the plasma barrier array 14.

The plasma barrier array 14 includes a plurality of plasma barrier frames distributed in an array. The pixel electrode 13 includes a plurality of pixel electrode units distributed in the array. Each plasma barrier frame includes the plurality of pixel electrode units, and the plasma barrier frame on the pixel electrode 13 covers on the source line and the gate line. The material of the plasma barrier frame and the liner frame 6 in the plasma barrier array 14 is acrylic resin, polyurethane resin, epoxy resin, organosilicon resin or silica. In embodiment 1, the width of the plasma barrier frame in the plasma barrier array 14 is between 1 and 30 microns, the preferred height is between 1 and 10 microns, the height is between 0.1 and 60 microns, and the preferred width is between 5 and 15 microns. The spacer particles in the spacer particle layer 16 are polymer microspheres or silica microspheres. In the embodiment 1, the size of spacer particles in the spacer particle layer 16 is between 1 and 10 microns, and the preferred size is 2-8 microns.

The plasma barrier array 14 and the spacer particle layer 16 divide the entire display plasma 3 between the transparent electrode 1 and the pixel electrode 13 into a plurality of barrier frames. The pixel electrode 13 driven by the IC integrated circuit module 11, includes segment codes, dot matrix and others. Due to the presence of the spacer particle layer 16, the electrophoretic particles can only move vertically up and down in the electric field direction between the pixel electrode 13 and the transparent electrode 1, thereby effectively preventing the electrophoretic particles in the display plasma 3 from moving along the transparent electrode 1 in disorder, ensuring the stability of the display plasma 3, enabling the display screen to display black and white, and improving the contrast ratio and display effect of the display screen.

The pixel electrode 13 is embedded on the TFT glass substrate, and the pixel electrode 13 is adhered to the display plasma 3 through the light-shielding insulating adhesive layer 5. The adhesive can be water-based, solvent-based, hot-melt, light-curable, etc., preferably water-based and light-curable. The thickness of the light-shielding insulating adhesive layer 5 ranges from 1 to 20 microns, and the preferred thickness ranges from 2 to 10 microns.

The transparent electrode 1 includes the conductive layer 2 overlying the display plasma 3 and the liner frame 6, and the transparent substrate 15 overlying the conductive layer 2. The display area protective layer 8 is arranged between the liner frame 6 and the conductive layer 2, and between the edge of the display plasma 3 and the conductive layer 2.

The thickness of the display plasma 3 is between 2 and 70 microns, preferably between 8 and 20 microns. The viscosity of the electrophoretic liquid in the display plasma 3 is between 100 and 100,000 centipoises, preferably between 1000 and 10,000 centipoises. The display plasma 3 includes at least two kinds of electrophoretic particles with different photoelectric properties.

In the embodiment 1, the supporting microspheres 4 are added in the liner frame 6. The supporting microspheres 4 include resin microspheres and glass microspheres. The diameter of the supporting microspheres 4 is 2-60 microns, and preferably is 5-30 microns.

In the embodiment of the present invention, the plasma barrier array 14 is used for uniformly dispersing and stabilizing the display plasma 3 can be arranged on the transparent electrode 1, and the spacer particle layer 16 is arranged between the plasma barrier array 14 and the pixel electrode 13. Alternatively, the plasma barrier array 14 for uniformly dispersing and stabilizing the display plasma 3 is arranged on the transparent electrode 1 and the pixel electrode 13, and the spacer particle layer 16 is absorbed on the plasma barrier arrays 14 and is arranged between the plasma barrier arrays 14. The plasma barrier array 14 and the spacer particle layer 16 divide the entire display plasma 3 between the transparent electrode 1 and the pixel electrode 13 into the plurality of barrier frames. The pixel electrode 13 driven by the IC integrated circuit module 11 includes segment codes, dot matrix and others. Due to the presence of the spacer particle layer 16, most of the electrophoretic particles can only move vertically up and down in the electric field direction between the pixel electrode 13 and the transparent electrode 1, thereby effectively preventing the electrophoretic particles in the display plasma 3 from moving between the plasma barrier frames in disorder, ensuring the stability of the display plasma 3, and improving the contrast ratio and display effect of the display screen.

The method for manufacturing the display plasma module with the double-layer microstructure in the aforementioned embodiment of the present invention includes the following steps.

Step 1: The plasma barrier array 14 is prepared on the conductive layer 2 of the pixel electrode 13 and/or the transparent electrode 1 in advance. The plasma barrier array 14 is coated on the surface of the conductive layer 2 of the pixel electrode 13 or the transparent electrode 1 by printing, coating, or dispensing, and then is solidified by light, heat or moisture, or is realized by physical growth and chemical growth.

The surface of the pixel electrode 13 may be coated with the light-shielding insulating adhesive layer 5 in advance.

Step 2: The pixel electrode 13 is embedded in the TFT glass substrate 7, and the TFT glass substrate is placed on the adhesive dispensing platform.

Step 3: The sealing adhesive is applied on the pixel electrode 13 to form the liner frame 6. The liner frame 6 surrounds the pixel electrode 13. The supporting microspheres 4 can be coated in the sealing adhesive in advance, and the supporting microspheres 4 can support the entire display plasma module in that the supporting microsphere 4 is a solid microsphere.

Step 4: The display plasma 3 is silkscreened in the liner frame 6 and the spacer particles are sprayed in the liner frame 6. The spacer particles in the spacer particle layer are polymer microspheres or silica microspheres, the size of the spacer particles is between 2 and 8 microns, and the weight of the spacer particle is approximately one fifth of the weight of the display plasma microsphere, and thus the spacer particle is relatively light and can float on the display plasma 3.

Step 5: The conductive silver paste 10 is coated in liner frame 16, so that the conductive silver paste 10 is electrically connected to the pixel electrode 13.

Step 6: Firstly, the display area protective layer 8 is laminated on the entire liner frame 6. Secondly, the transparent electrode 1 (including the conductive layer 2 and the transparent substrate 15) is laminated on the liner frame 6 and the display plasma 3. In the process, due to the adsorption force between the spacer particles and the plasma blocking array 14, most of the spacer particles are squeezed, transferred, and adsorbed on the plasma barrier frame of the plasma barrier array 14 to form the spacer particle layer 16, and then is solidified by light, heat or moisture. The conductive silver paste 10 is electrically connected to the conductive layer 2 of the transparent electrode 1.

Step 7: The transparent electrode 1 and the display area protective layer 8 on the edge is cut off to expose the predetermined position where the IC integrated circuit module 11 and the flexible circuit board 12 on the pixel electrode are bonded.

Step 8: The IC integrated circuit module 11 and the flexible circuit board 12 are both adhered to the edge of the pixel electrode 13 through a conductive adhesive tape;

Step 9: The peripheries of the IC integrated circuit module 11, the flexible circuit board 12 and the conductive adhesive tape are firmly sealed on the pixel electrode 13 by the blue adhesive 9, thus completing the manufacturing of the electronic ink display screen.

The display plasma 3 of the present invention includes at least two kinds of electrophoretic particles with different photoelectric properties, wherein, the preferred colors of the electrophoretic particles include white, black, red, green, blue, yellow and others to realize the display of black and white, single color, dual color, multicolor, true color and others. At the same time, the display plasma 3 may include a fluorescent material. The fluorescent material includes an inorganic fluorescent material and an organic fluorescent material. The inorganic fluorescent material includes a rare earth fluorescent material, a metal sulfide and others. The organic fluorescent material includes a small molecule fluorescent material, a polymer fluorescent material and others.

The display plasma module of the present invention does not need the conventional microstructures such as microcapsule or micro-cup and directly uses the display plasma 3. The plasma barrier array 14 and the spacer particle layer 16 are arranged in the display plasma 3 between the transparent electrode 1 and the pixel electrode 13. The plasma barrier array 14 and the spacer particle layer 16 are used for supporting the entire display plasma module, and can reduce the thickness of the display plasma module and divide the entire display plasma into a plurality of resistance frames, which ensures that the electrophoretic particles orderly move along the electric field direction under the action of the electric field, ensures the stability of the display plasma, and improves the contrast ratio and the display effect of the display screen.

The present invention and the embodiment thereof are described above, and the description is not restrictive. What is shown in the drawings is only one of the embodiments of the present invention, and the actual structure is not limited thereto. If those skilled in the art are inspired from the technical solution and design the structural mode and the embodiment similar to the technical solution without departing from the inventiveness of the present invention, and the structural mode and the embodiment shall fall within the protective scope of the present invention.

What is claimed is:

1. A display plasma module with a double-layer microstructure, comprising a pixel electrode and a transparent electrode located above the pixel electrode, wherein
    a display plasma and a liner frame surrounding the display plasma are disposed between the pixel electrode and the transparent electrode;
    a plasma barrier array for uniformly dispersing and stabilizing the display plasma is arranged on the pixel electrode and/or the transparent electrode; and
    a spacer particle layer is adsorbed on the plasma barrier array, wherein each spacer particle of the spacer particle layer is a microsphere and has a radius larger than a width of a plasma barrier in the plasma barrier array.

2. The display plasma module with the double-layer microstructure according to claim 1, wherein
    the plasma barrier array comprises a plurality of plasma barrier frames distributed in an array;
    the pixel electrode comprises a plurality of pixel electrode units distributed in the array;
    each of the plurality of plasma barrier frames comprises the plurality of pixel electrode units; and
    the plasma barrier array on the pixel electrode covers on a source line and a gate line.

3. The display plasma module with the double-layer microstructure according to claim 1, wherein
    a width of a plasma barrier frame in the plasma barrier array is between 1 and 30 microns,
    a height of the plasma barrier frame in the plasma barrier array is between 0.1 and 60 microns, and
    a size of spacer particles in the spacer particle layer is between 1 and 10 microns.

4. The display plasma module with the double-layer microstructure according to claim 1, wherein
    a material of a plasma barrier frame and the liner frame in the plasma barrier array is selected from the group consisting of acrylic resin, polyurethane resin, epoxy resin, organosilicon resin, and silica; and
    spacer particles in the spacer particle layer are polymer microspheres or silica microspheres.

5. The display plasma module with the double-layer microstructure according to claim 1, wherein the pixel electrode is embedded on the thin film transistor (TFT) glass substrate, and the pixel electrode and the display plasma are adhered through a light-shielding insulating adhesive layer.

6. The display plasma module with the double-layer microstructure according to claim 1, wherein
    the transparent electrode comprises a conductive layer overlying the display plasma and the liner frame, and a transparent substrate overlying the conductive layer;
    a display area protective layer is arranged between the liner frame and the conductive layer; and
    the display area protective layer is arranged between an edge of the display plasma and the conductive layer.

7. The display plasma module with the double-layer microstructure according to claim 1, wherein
    a thickness of the display plasma is between 2 and 70 microns;
    a viscosity of an electrophoretic liquid in the display plasma is between 100 and 100,000 centipoises; and
    the display plasma comprises at least two kinds of electrophoretic particles with different photoelectric properties.

8. The display plasma module with the double-layer microstructure according to claim 1, wherein
    supporting microspheres are added in the liner frame;
    the supporting microspheres comprise resin microspheres and glass microspheres; and a diameter of the supporting microspheres is 2-60 microns.

9. The display plasma module with the double-layer microstructure according to claim 1, further comprising a light-shielding insulating adhesive layer positioned between the plasma barrier array and the pixel electrode.

\* \* \* \* \*